United States Patent [19]

Weber

[11] Patent Number: 5,014,964
[45] Date of Patent: May 14, 1991

[54] VENT NOZZLE

[75] Inventor: Walter K. Weber, Grand Rapids, Mich.

[73] Assignee: K. B. Lighting Inc., Kentwood, Mich.

[21] Appl. No.: 478,255

[22] Filed: Feb. 9, 1990

Related U.S. Application Data

[63] Continuation-in-part of Ser. No. 403,147, Sep. 1, 1989.

[51] Int. Cl.$^5$ .............................................. F16K 31/00
[52] U.S. Cl. .................................... 251/352; 251/209; 251/367; 251/904
[58] Field of Search ............... 251/208, 209, 349, 352, 251/904, 367

[56] References Cited

U.S. PATENT DOCUMENTS

| | | | |
|---|---|---|---|
| 2,911,008 | 11/1959 | DuBois | 137/625.31 |
| 3,598,150 | 8/1971 | Nolan | 251/352 |
| 4,137,945 | 2/1979 | Cutts | 251/208 |
| 4,183,499 | 1/1980 | Swartz et al. | 251/208 |
| 4,298,020 | 11/1981 | Inada et al. | 251/367 |
| 4,449,692 | 5/1984 | Rhodes | 251/144 |
| 4,723,567 | 2/1988 | Philpot et al. | 251/367 |
| 4,789,000 | 12/1988 | Aslanian | 251/209 |

Primary Examiner—A. Michael Chambers
Attorney, Agent, or Firm—Michael J. Striker

[57] ABSTRACT

An adjustable vent nozzle has two nozzle members turnable relative to one another, the first nozzle member having an inlet opening for communicating an interior of the nozzle with ambient atmosphere and a lower surface provided with a guiding, the second nozzle member having an outlet opening with a passage which is open in the outlet and formed to guide the guide of the first nozzle member so that in an assembled condition when one of the nozzle members is turned relative to another of the nozzle members the guide is guided in the air passage. In a predetermined angular position of the nozzle members relative to one another they can be fixed relative to one another to define a predetermined length of the passage between the inlet opening and the outlet opening and therefore to adjust an air supply through the nozzle into an interior of a device to be vented and communicating with the outlet opening. The second nozzle member has a mounting element formed for mounting on a device to be vented and including a transversely expansible projection arranged to pass through a hole in a wall of the device and then expand and anchor in the vent nozzle in the device.

13 Claims, 4 Drawing Sheets

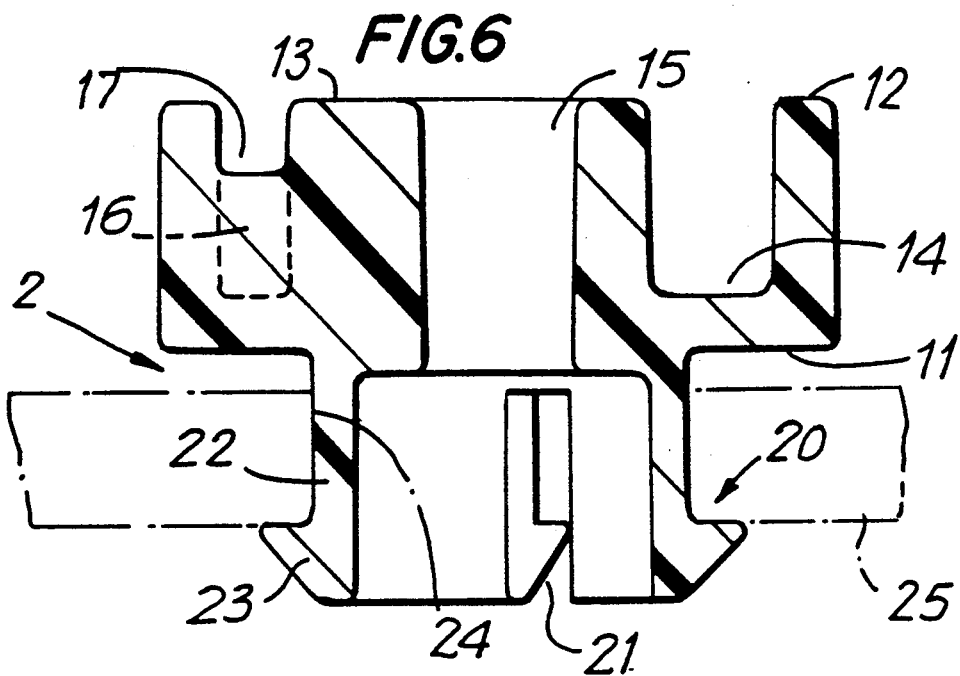
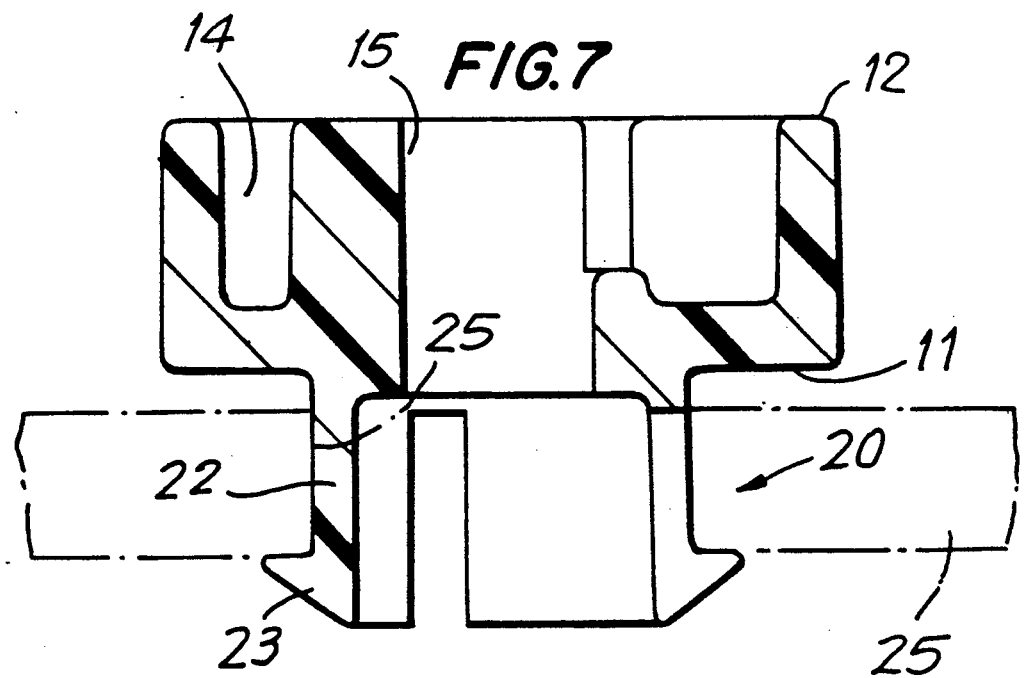

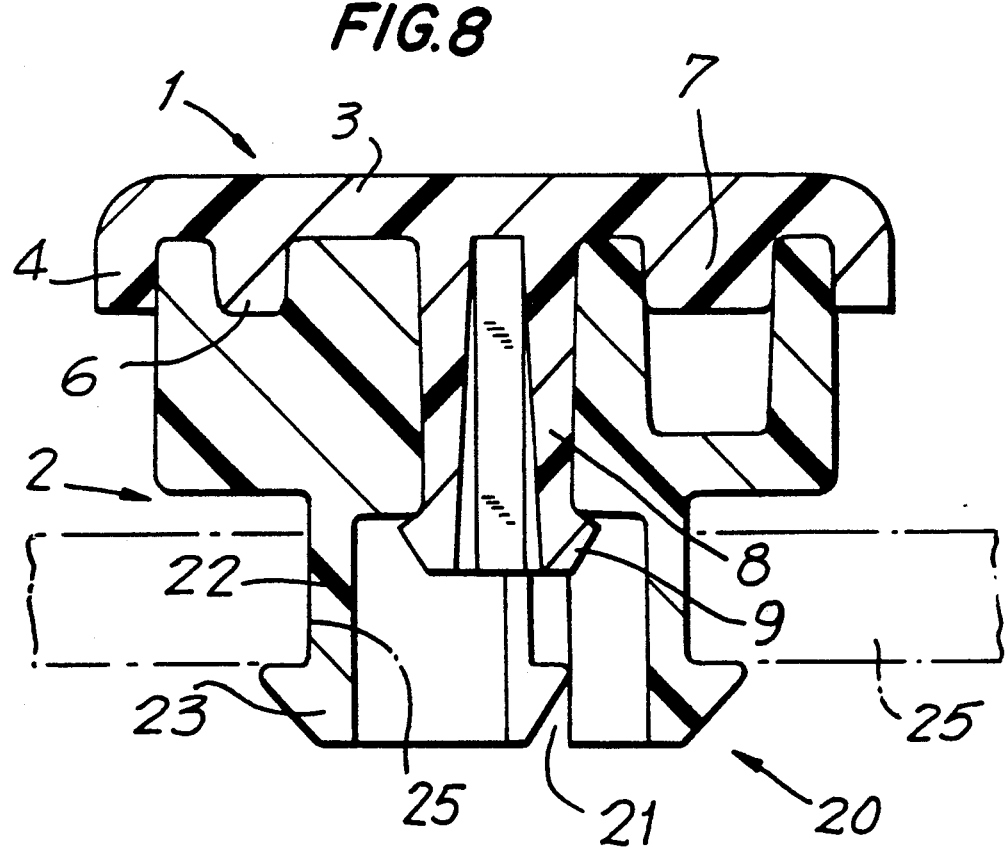

ic application is a continuation-in-part of application Ser. No. 403,147, filed on Sept. 1, 1989.

VENT NOZZLE

CROSS-REFERENCE TO A RELATED APPLICATION

This application is a continuation-in-part of application Ser. No. 403,147, filed on Sept. 1, 1989.

BACKGROUND OF THE INVENTION

The present invention relates to adjustable vent nozzles and particularly to vent nozzles for headlamps, other lamps in the automotive field as well as other devices.

Vent nozzles for venting interiors of lighting equipment as well as other devices are widely known and used. Depending on the volume of the interior of the device to be vented, specific operational conditions, as well as other factors, the throughput of the vent nozzle has to be adjusted to provide an optimal ventilation. Known vent nozzles for these purposes possess certain disadvantages and can be further improved.

SUMMARY OF THE INVENTION

Accordingly, it is an object of the present invention to provide a vent nozzle which can be easily adjusted to respective devices which have to be ventilated.

In keeping with these objects and with others which will become apparent hereinafter, one feature of the present invention resides, briefly stated, in a vent nozzle which has two nozzle members rotatable relative to one another, one of the nozzle members being provided with an outlet opening for discharging air into the interior of a device to be vented and also with a passage extending to the outlet opening, the other of the nozzle members having an inlet opening communicating an ambient atmosphere with said passage of said one nozzle member and being turnable relative to the one nozzle member so as to vary the position of the inlet opening relative to the passage thereby to adjust an air supply to the interior of the device, and the one nozzle member is provided with means for mounting the vent nozzle on the device and including an expansible projection which can pass through a mounting opening in the device and expands to become anchored in the device.

When the vent nozzle is designed in accordance with the present invention it permits an easy adjustment of the throughput of the vent nozzle relative to the specific requirements of particular devices to be ventilated. The mounting of the device is performed in an especially simple and advantageous manner. It suffices to insert the mounting means of one nozzle member or the expansible projection through the hole of the device, and then the projection expands and becomes anchored in the hole of the device and the vent nozzle becomes reliably mounted on the device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 6 and 7 are views showing sections of the part of FIG. 5 taken along the lines C—C and D—D in FIG. 5; and FIG. 8 is a view showing a section of the adjustable vent nozzle in accordance with the present invention in assembled condition.

DESCRIPTION OF THE PREFERRED EMBODIMENTS

Figure 1:
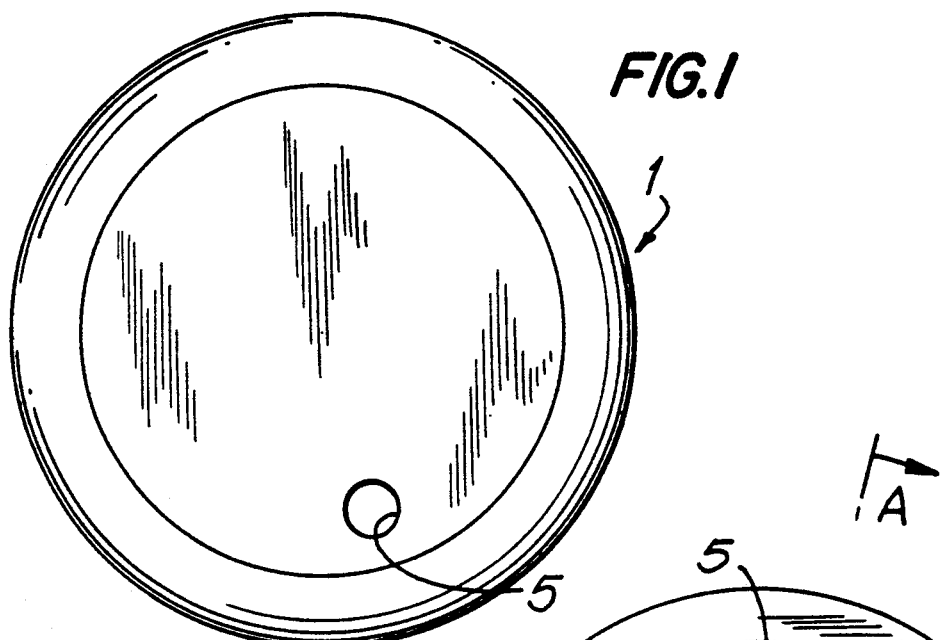
FIG. 1 is a plan view of the top surface of one part of an adjustable vent nozzle in accordance with the present invention.
Figure 2:
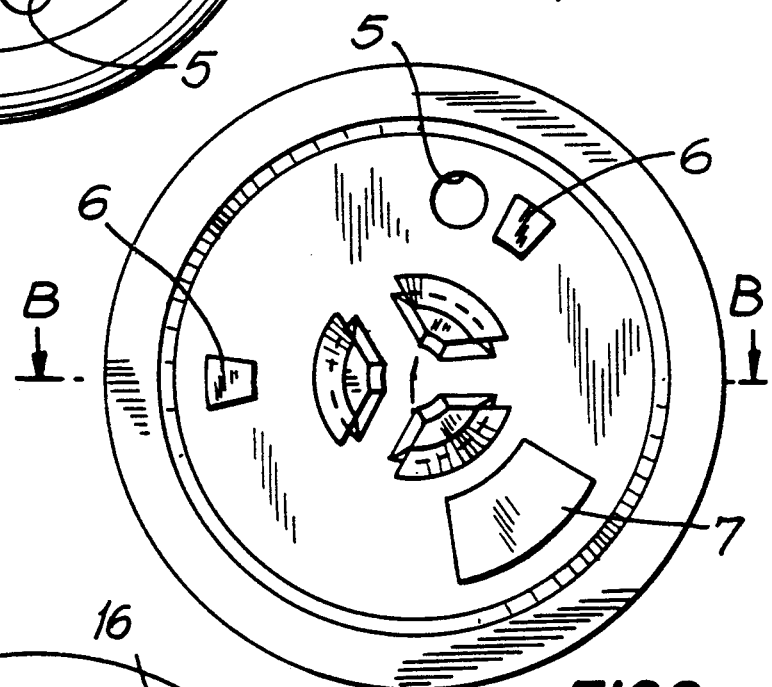
FIG. 2 is a plan view of a bottom surface of the nozzle part of FIG. 1.
Figure 5:
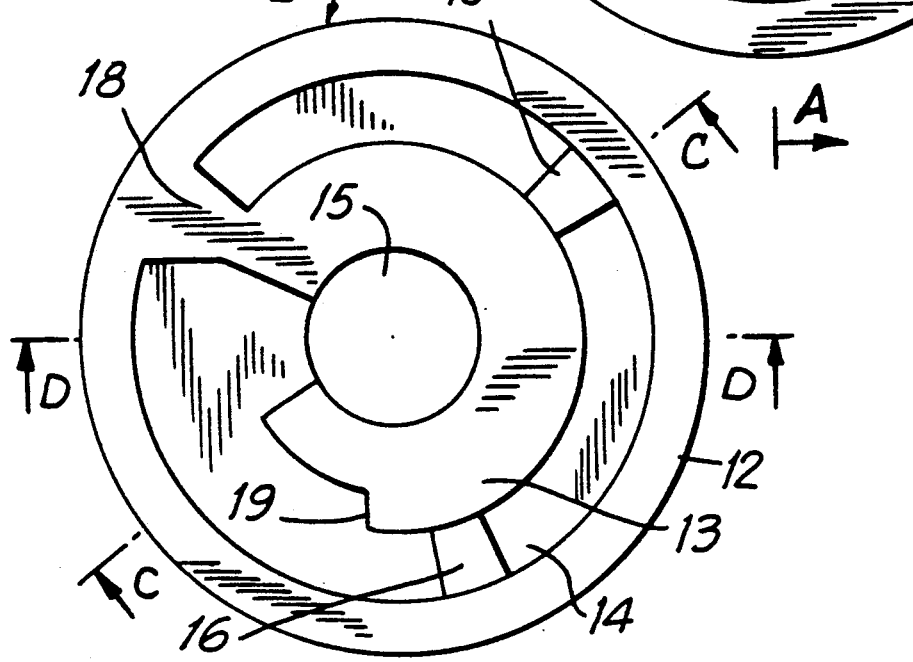
FIG. 5 is a plan view of a top surface of the other part of the adjustable vent nozzle in accordance with the present invention.
Figure 3:
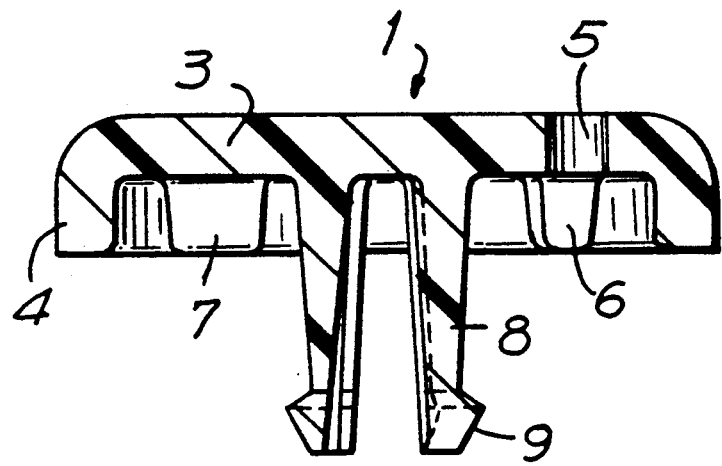
FIGS. 3 and 4 are views showing sections of the nozzle parts of FIGS. 1 and 2 taken along the lines A—A and B—B in FIG. 2.
Figure 4:
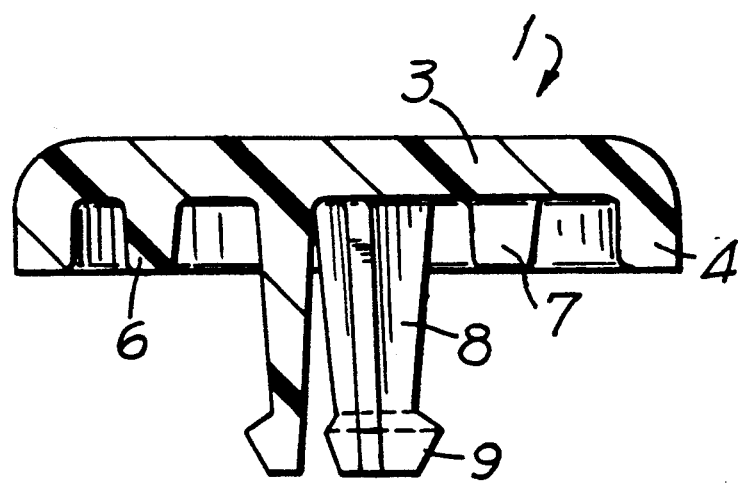

An adjustable vent nozzle for headlamps, other lamps and other devices has two nozzle members identified as a whole with reference numerals 1 and 2. The nozzle member 1 is substantially cup-shaped and has a top wall 3 and a peripheral wall 4. An inlet opening 5 extends through the top wall 3 and communicates the interior of the vent nozzle with the ambient atmosphere. The bottom surface of the nozzle member 1 is provided with two guiding projections 6 which are angularly spaced from one another and also with an adjusting projection 7 angularly spaced from the guiding projections. The guiding projections 6 are located on the same radius. The nozzle part 1 is also provided with engaging means which includes three plastic prongs 8 extending from the central area of the bottom surface of the nozzle member 1 and angularly spaced from one another. The free end of each of the prongs 8 is provided with a double conical projection 9 having two oppositely inclined conical surfaces.

The second nozzle part 2 is also cup-shaped and has a lower wall 11, an upwardly extending peripheral wall 12 and an inner partially circular wall 13. A passage 13 is formed between the walls 12 and 13. The passage 14 communicates with an outlet opening 15 formed in the bottom wall 11. A plurality of projections, for example two projections 16 extend from the bottom of the passage 14 and have a height which is smaller than the height of the passage 14. Overflow passages 17 are formed on the top of the projections 16 and communicate the portions of the passage 14 with one another. The overflow passages 17 have a depth which is smaller than the depth of the passage 14. The passage 14 is closed by a partition 18. The inner partially circular wall 13 has a stepped portion forming an abutment 19.

The nozzle member 2 is provided with means for mounting the vent nozzle on the head lamp and other devices. the mounting means 20 is formed as an expansible projection which extends in the axial direction and has a plurality of slots 21 subdividing the projection into a plurality of prongs 22. As a result, the projection is expansible and compressible in the direction which is transverse to the axis. Each of the projections 22 has an end which is distal from the nozzle member 2 and is provided with an engaging formation 23. The engaging formations 23 can be inclined at an angle relative to the axis so as to conically converge in direction away of the nozzle member 2.

The adjustable vent nozzle in accordance with the present invention operates in the following manner.

First of all, the nozzle part 2 is mounted on a headlamp or another device. For this purpose, the projection 20 of the nozzle part 2 is pushed through a hole of a wall 25 of the headlamp. Due to the transverse flexibility of the projection 20, it is first transversely compressed and passes through the hole. When the engaging formations have passed the hole and are located at the opposite side of the wall 25, the projection 20 spreads and the nozzle member 2 becomes reliably mounted on the wall 25. Then, the nozzle part 1 is placed on the top of the nozzle part 2 so that peripheral wall 4 of the nozzle part 1 engages around the peripheral wall 12 of the nozzle part. Then the nozzle part 1 is turned relative to the nozzle part 2 over a predetermined angle. During the turning the projections 6 are guided in the passage 4 and the projection 7 turns in the area before the abutment 19. At a desired location, the nozzle member 1 is pressed down so that the prongs 8 are pressed radially inwardly and the double-conical ends 9 extend downwardly beyond the lower surface 21 of the nozzle member 2. When the double-conical ends 9 are located below the surface 21 they spread radially apart and engage from below the surface so that the nozzle member 1 can no longer be withdrawn upwardly. The desired location, at which the nozzle member 1 is fixed with the nozzle member 2 is selected in dependence upon the required ventilation of a respective device. Depending on the angular position of the inlet opening 5 relative to the outlet opening 15, the length of the passage between the openings 5 and 15 changes and therefore the air supply is also adjusted. The partitions 16 form barriers for the air passage to also affect the conditions of air passage through the nozzle. The abutment 19 forms the limit for the projection 7. The height of the projections 6 and 7 is smaller than the depth of the passage 14, so that in the assembled condition air can pass underneath the projections 6 and 7 in the passage 14. The radial width of the projection 6 substantially corresponds to the radial width of the passage 14 to provide the guidance during the turning of the nozzle part 1 relative to the nozzle part 2. The radial width of the projection 7 corresponds to the radial width of the passage 14 in its wider area near the abutment 19.

It will be understood that each of the elements described above, or two or more together, may also find a useful application in other types of constructions differing from the types described above.

While the invention has been illustrated and described as embodied in an adjustable vent nozzle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to h=protected by Letters Patent is set forth in the appended claims.

I claim:

1. An adjustable vent nozzle, comprising a first nozzle member; a second nozzle member, said nozzle members being turnable relative to one another, said first nozzle member having an inlet opening for communicating an interior of the nozzle with ambient atmosphere and also having a lower surface provided with guiding means, said second nozzle member having an outlet opening for communicating with an interior of a device to be vented and an air passage which is open in said outlet opening and formed to guide said guiding means of said first nozzle member so that in an assembled condition when one of said nozzle members is turned relative to another of said nozzle members said guiding means are guided in said air passage in a predetermined angular position of said nozzle members relative to one another they can be fixed relative to one another to define a predetermined length of said passage between said inlet opening and said outlet opening and therefore to adjust an air supply through the nozzle into an interior of said device to be vented and communicating with said outlet opening, said second nozzle member having means for mounting the vent nozzle on the device to be vented and including a transversely expansible projection arranged to expand through a hole of the wall of the device and anchor said second nozzle member in the device.

2. An adjustable vent nozzle as defined in claim 1, wherein said expansible projection has a plurality of longitudinal slot subdividing said expansible projection into a plurality of elongated prongs which are flexible in the transverse direction.

3. An adjustable vent nozzle as defined, in claim 2, wherein each of said prongs has an end which is distal from said second nozzle member and is provided with engaging formation arranged to engage behind the wall of the device when satd projecton passes through the hole of the wall of the device.

4. An adjustable vent nozzle as defined in claim 2, wherein said second nozzle member is provided with at least one abutment for abutting at least one of said projections of said first member thereagainst.

5. An adjustable vent nozzle as defined in claim 1, wherein said guiding means includes a plurality of projections extending from a bottom surface of said first nozzle member and spaced angularly from one another.

6. An adjustable vent nozzle as defined in claim 1, wherein said second nozzle member is provided with a plurality of partitions formed with said passage.

7. An adjustable vent nozzle as defined in claim 1; and further comprising means for fixing said nozzle members relative to one another in the desired position.

8. An adjustable vent nozzle as defined in claim 7, wherein said fixing means includes expansible element located in a central area of said first nozzle member and engageable in said outlet opening of said second nozzle member to be fixed therein.

9. An adjustable vent nozzle as defined in claim 8, wherein said expansible element has a plurality of prongs angularly spaced from one another elastically engageable in said outlet opening.

10. An adjustable vent nozzle as defined in claim 9, wherein each of said prongs has a free end having a double-conical shape, so that in an assembled condition said double-conical ends extend downwardly beyond a lower surface of said second nozzle member and engage therebehind.

11. An adjustable vent nozzle as defined in claim 1, wherein said first nozzle member and said second nozzle member have a joint axis about which said nozzle members are turned relative to one another, said inlet opening having an axis and said outlet opening having an axis, said axes of said inlet opening and said outlet opening extending in a same direction in which said axis of said nozzle members extends, said first nozzle member and said second nozzle member being assembleable with one anotehr by moving said nozzle members toward one another in direction of said axis of said nozzle members.

12. An adjustable vent nozzle as defined in claim 1, wherein only said first nozzle member and said second nozzle member together form said adjustable nozzle, so that no other nozzle members are present in said adjustable vent nozzle.

13. An adjustable vent nozzle as defined in claim 1, wherein said expansible projection has a plurality of longitudinal slots subdividing said expansible projection into a plurality of elongated prongs which are flexible in a transverse direction, each of said prongs having an end which is distal from said second nozzle member and is provided with engaging formation arranged to engage behind the wall of the device when said projection passes through the hole of the wall of the device, said fixing means including an expansible element located in the central area of said first nozzle member and engageable in said outlet opening of said second nozzle member to be fixed therein, said expansible element having a plurality of prongs angularly spaced from one another and elastically engageable in said outlet opening, each of said prongs of said expansible element having a free end provided with engaging formation arranged to engage beyond the lower surface of said second nozzle member and engage them behind.

* * * * *